POWER WHEEL DRIVE ASSEMBLY

Original Filed Jan. 18, 1965 3 Sheets-Sheet 1

INVENTORS
Howard W. Christenson,
& William G. Livezey

A. M. Heiter
ATTORNEY

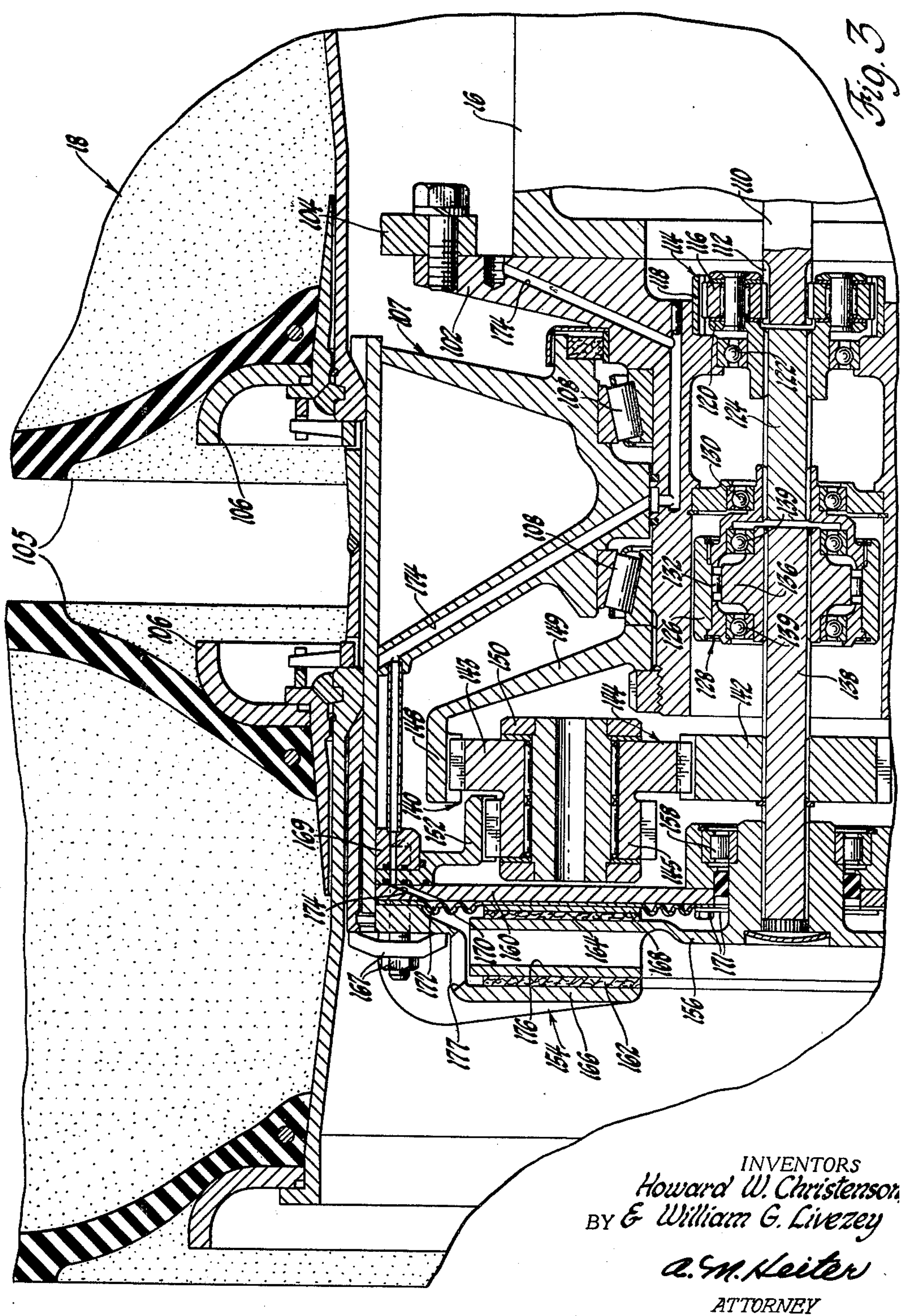
INVENTORS
Howard W. Christenson
BY & William G. Livezey
A. M. Heiter
ATTORNEY POWER WHEEL DRIVE ASSEMBLY
Original Filed Jan. 18, 1965
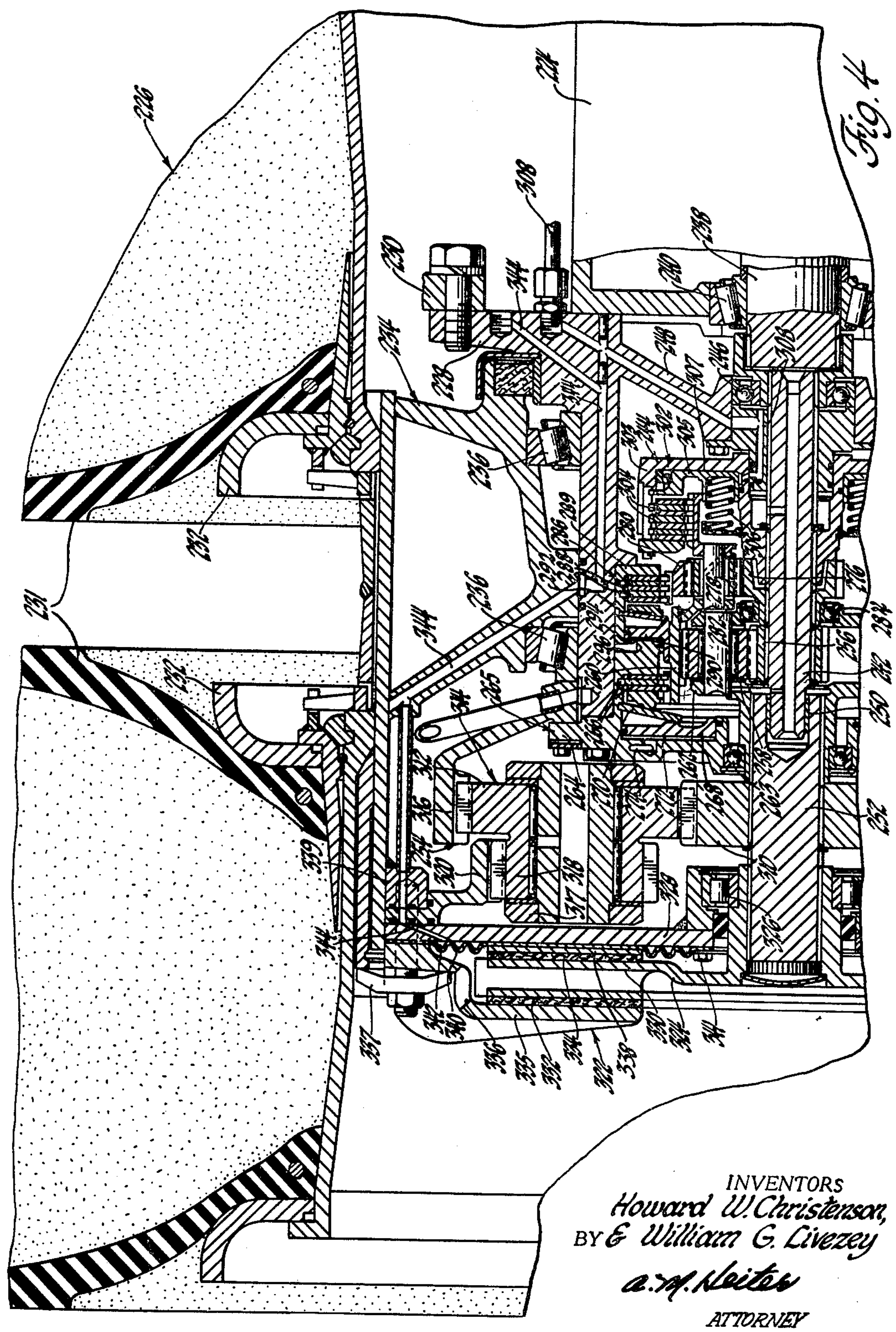
INVENTORS
Howard W. Christenson,
BY & William G. Livezey
A. M. Heiter
ATTORNEY

United States Patent Office 3,502,166 Patented Mar. 24, 1970

1

3,502,166
POWER WHEEL DRIVE ASSEMBLY

Howard W. Christenson and William G. Livezey, Indianapolis, Ind., assignors to General Motors Corporation, Detroit, Mich., a corporation of Delaware Original application Jan. 18, 1965, Ser. No. 426,330. Divided and this application July 19, 1968, Ser. No. 746,223
Int. Cl. B60k *1/00, 9/00*
U.S. Cl. 180—55 4 Claims

ABSTRACT OF THE DISCLOSURE

A power wheel drive assembly having a reduction gear unit providing final reduction drive from a motor to a vehicle wheel. A wheel brake is connected in the gear unit so that it handles less than wheel torque and its dynamic brake member rotates faster than wheel speed to provide pumping action for brake cooling.

This is a division of applicants' pending application Ser. No. 426,330 filed Jan. 18, 1965, now Patent No. 3,421,596.

This invention relates to power wheel drives and more particularly to the integration of a wheel brake in a power wheel drive assembly.

In accordance with this invention, there is provided a power wheel drive assembly for use in a vehicle drive train. The power wheel drive assembly has a reduction gear unit providing a final reduction drive and braking efficiency at the wheel is increased by connection of a wheel brake to a low torque, high speed member in the gear unit so that the brake handles less than wheel torque and its dynamic brake member rotates faster than wheel speed to provide greater pumping action for brake cooling. The power wheel drive assembly including the brake is located in the wheel and is removable without removal of the wheel's spindle assembly.

An object of this invention is to provide an improved power wheel drive assembly having a brake.

Another object of this invention is to provide a power wheel drive assembly having a brake with increased efficiency.

Another object of this invention is to provide a power wheel drive assembly having a wheel brake combined with a reduction gear unit so that the brake handles less than wheel torque and the brake's dynamic member rotates faster than wheel speed to provide pumping action for brake cooling.

These and other objects of the invention will be more apparent from the following description of the preferred embodiments of the invention illustrated in the drawings:

FIGURE 1 diagrammatically shows a vehicle having a prime mover and a power wheel drive transmission system in which one embodiment of the power wheel drive assembly constructed according to this invention is employed.

FIGURE 2 diagrammatically shows a vehicle having a prime mover and another power wheel drive transmission system in which another embodiment of the power wheel drive assembly constructed according to this invention is employed.

FIGURE 3 shows an actual construction of the power wheel drive assembly employed in the power wheel drive in FIGURE 1.

FIGURE 4 shows an actual construction of the power wheel drive assembly employed in the power wheel drive transmission system shown in FIGURE 2.

Figure 1:
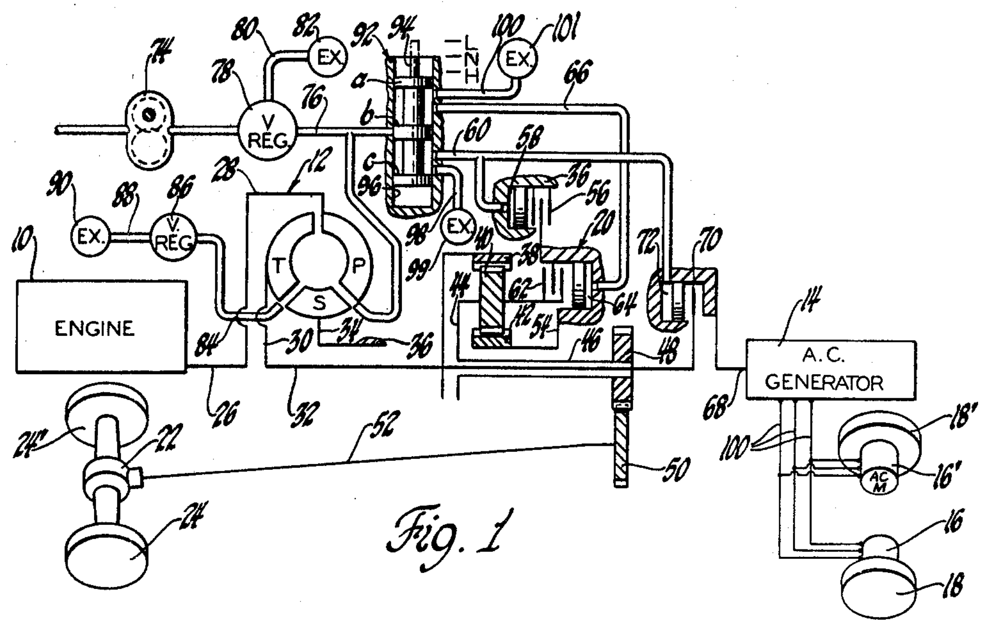

In FIGURE 1 there is shown a four wheel drive vehicle having an internal combustion engine 10 as its prime mover which provides power to drive a hydrodynamic torque converter 12. In the transmission system generally, converter drive is available to an AC generator 14-plural, synchronous AC motors 16, 16' set to drive the vehicle's rear wheel assemblies 18, 18' through a multiple-ratio gear unit 20 and is also available to a conventional differential torque divider and speed reduction gear unit 22 to drive the vehicle's steerable front wheel assemblies 24, 24'.

2

The engine output shaft 26 is connected to drive the rotary torque converter housing 28 which drives the torque converter pump P. As in conventional three element torque converters, the pump P circulates fluid in a toroidal circuit to drive the turbine T, which is connected by a hub 30 to the torque converter output or turbine shaft 32. The stator S provides reaction in the fluid circuit and is held against backward rotation by a one-way brake (not shown) or fixed by the hub structure 34 to the housing 36 for the converter 12 and gear unit 20.

The converter output shaft 32 drives the ring gear 38 of gear unit 20, ring gear 38 meshing with planetary pinions 40 which in turn mesh with sun gear 42. Pinions 40 are mounted on a carrier 44 driving the gear unit's output sleeve shaft 46 which surrounds converter output shaft 32 and extends centrally through sun gear 42 to connect with a spur gear 48. Gear 48 meshes with a spur gear 50 of the same pitch diameter which drives a propeller shaft assembly 52. Propeller shaft assembly 52, which has conventional universal joints, is connected to drive the differential and reduction gear unit 22. Sun gear 42 is connected to a control hub 54 which can be connected to housing 36 by a brake 56 actuated by a motor 58 on the supply of fluid under pressure via connected line 60. Control hub 54 can also be connected to the carrier 44 by clutch 62 which is engaged when motor 64 is supplied via line 66 by fluid under pressure.

When sun gear 42 is braked by brake 56 the carrier 44 and connected output shaft 46 are driven by shaft 32 in the forward direction and at a reduced speed to provide a low drive. When sun gear 42 and carrier 44 are connected by clutch 62, gear unit 20 is locked up and the output shaft 46 is driven by shaft 32 in the forward direction at the same speed to provide a high or direct drive.

The converter output shaft 32 can also be directly connected to drive the generator input shaft 68 by clutch 70 when motor 72 is supplied with fluid under pressure via line 60 which also supplies the low brake motor 58. The friction clutches and brakes described above have suitable retraction springs, not shown, for disengagement.

Gear unit 20 will thus provide two forward speed ranges, those being a low or reduction drive and a high or direct drive and in addition there is provided a converter drive to generator 14. These drives are controlled by a transmission control system supplied with fluid under pressure from a suitable collecting sump, not shown, by an engine or input driven pump 74. This pump supplies fluid to a main line 76 at a pressure regulated by regulator valve 78 which exhausts overage to the sump via overage line 80 and exhaust 82.

Fluid at main line pressure is supplied to converter 12 where pressure is regulated through line 84 by a regulator valve 86 which exhausts overage to the sump through line 88 and exhaust 90.

Selector valve 92 provides the control to selectively connect main line 76 with the motor lines and includes a manually controlled valve element 94 having equal diameter lands *a, b* and *c* slidably mounted in bore 96 of the valve housing. In the neutral control valve position (N) as shown in FIGURE 1, land *b* blocks main line 76, line 60 is connected in the bore between lands *b* and *c* through line 98 to exhaust 99 and motor line 66 is connected in the bore between lands *a* and *b* through line 100 to exhaust 101, all exhausts being connected to the sump. Selector valve element 94 when moved to the low drive position (L) connects main line 76 between lands *b* and *c* to line 60 which feeds both the low brake motor 58 for low drive and the generator clutch motor 72. Valve element 94 when moved to the high drive position (H) connects main line 76 between lands *a* and *b* to the high clutch line 66 which feeds the high clutch motor 64 for high drive. In each drive ratio the motor lines not supplied with fluid under pressure are exhausted.

Electric power from the AC generator 14 is connected by lines 100 to the synchronous AC motors 16, 16' which complete the electric drive to the rear driving wheel assemblies, 18, 18'. Since both the electric motors 16, 16' and their drive connections to the rear driving wheels are the same, the following description of motor 16 and its drive connection also applies to the other motor 16' and its drive connection.

Motor 16, as best shown in FIGURE 3 in an actual power wheel construction, is rigidly connected by bolts, not shown, to the nonrotatable wheel spindle 102 which is connected through suitable linkage, a portion of which is shown at 104, to the vehicle chassis, not shown. The wheel assembly 18 has dual tires 105 which are rotatably supported through rims 106 and associated hub structure 107 by antifriction bearings 108 on the wheel spindle 102. The electric motor output shaft 110 has an integral sun gear 112 which provides input drive to a reduction gear unit 114 and meshes with planetary pinions 116. Pinions 116 in turn mesh with a ring gear 118 which is rigidly secured to spindle 102 to provide reaction for this gear unit. Pinions 116 are mounted on a carrier 120 which is rotatably supported by an antifriction bearing 122 in the hollow wheel spindle 102 and connected through its hub to drive an intermediate shaft 124 which is thereby driven in the forward direction and at a reduced speed relative to motor shaft 110.

Shaft 124 is in turn connected to drive the input or outer race member 126 of a one-way clutch 128, the hub of the outer race member together with the connected outboard end of shaft 124 being supported by an antifriction bearing 130 in a supporting web secured in spindle 102. Rollers 132 provide a positive drive between the outer race cam member 126 and an inner race member 136 which is connected to drive a final drive gear reduction input shaft 138 when member 126 is driven forwardly by the electric motor 16. Rollers 132 permit overrunning of shaft 138 relative to shaft 124 in the forward direction on the antifriction bearings 139 between the race members for reasons which will become more apparent from the description of operation which follows subsequently.

A planetary gear unit 140 completes the final drive from shaft 138 to driven wheel hub 107 and comprises a sun gear 142 driven by shaft 138 meshing with the larger pinions 143 of the compound planetary pinions 144. Larger pinions 143 in turn mesh with a ring gear 148 grounded for reaction through integral hub 149 to the nonrotatable wheel spindle 102. The compound planetary pinions 144 are mounted on a carrier 150 free to rotate and the smaller pinions 145 mesh with a second ring gear 152 which is rigidly connected to drive wheel hub 107. Rotation of sun gear 142 in the forward direction will then rotate ring gear 152 and connected wheel hub 107 in the forward direction and at a reduced speed relative to shaft 138.

A disc brake 154 when engaged brakes wheel hub 107 and comprises a brake disc 156 whose hub is connected to the outboard end of shift 138. Disc 156 together with shaft 138 is supported by an antifriction bearing 158 in a bearing plate 160 which is rigidly secured to the rotatable wheel hub 107. Friction rings 162 and 164 sandwich the opposite brake surfaces of brake disc 156. Ring 162 is bonded to an annular brake reaction member 166. Member 166 is rigidly secured by bolt and clamp assemblies 167 to a mounting ring 169 welded to the wheel hub structure 107, these bolt and clamp assemblies also serving to rigidly secure plate 160 and ring gear 152 to wheel hub 107. Friction ring 164 is bonded to a backing plate 168 which in turn is rigidly secured to a metallic bellows-type diaphragm 170. The annular diaphragm 170 is rigidly secured to plate 160 at its outer radius by bolt and clamp assemblies 167 and at its inner radius by a bolt and ring assembly 171.

The diaphragm 170 through its sealing contact at its inner and outer radii with plate 160 provides a motor chamber 172. Chamber 172 when supplied with fluid under pressure from any suitable source via fluid passage 174 expands to pack the rotating friction rings 162, 164 and the rotating brake disc 156. With brake 154 engaged, relative rotation between wheel hub 107 and shaft 138 is prevented and thus relative rotation between ring gear 152 and sun gear 142 of gear unit 140 is prevented providing lockup in this gear unit. Since ring gear 148 is grounded to nonrotatable wheel spindle 102, the rotating wheel hub 107 is brought to rest. The spring action of the metallic diaphragm 170 retracts the friction ring 164 when chamber 172 is exhausted to fully disengage the brake.

Brake disc 156 has a plurality of pump vanes provided by circumferentially spaced, radially extending, straight through slots 176 between the disc braking surfaces which during brake engagement provide an air pumping action for brake cooling. The pumped air is vented through slots 177 in member 166. Since brake disc 156 will be rotating at a speed faster than wheel speed as determined by the reduction ratio in gear unit 140, the volume of air pumped will be greater than that available when the brake disc rotates at wheel speed. Another feature of this brake is that it is only required to handle a fraction of wheel torque as determined by gear unit 140 and thus can be of smaller capacity than a brake handling full wheel torque.

Describing now the operation of the FIGURE 1 arrangement with the FIGURE 3 power wheel drive assembly, this power wheel drive transmission system provides four wheel drive through geared drive to the front driving wheels and electric motor drive to the rear driving wheels in the low drive range of controlled gear unit 20. With selector valve 92 conditioned for low, low brake motor 58 is supplied with main line pressure for engagement of low brake 56 to provide the low reduction drive to the differential and reduction gear unit 22 to drive the front wheels. The generator clutch motor 72 is simultaneously supplied with main line pressure to engage the clutch 70 to provide direct converter or turbine drive to generator 14 to power the motors 16, 16' to drive the rear wheels.

By design, there is provided a slightly larger speed reduction between turbine shaft 32 and the front wheels in the low drive range than the speed reduction between turbine shaft 32 and the rear wheels. The vehicle being initially at rest, the engine 10 is then accelerated and since the front and rear vehicle wheels rotate at the same speed by virtue of ground contact, the small difference in speed reduction in low forces slip between the AC generator 14 and synchronous AC motors 16, 16' recognizing that such slip is required before the synchronous motors will pull sufficient driving torque. Generator 14 is driven by turbine shaft 32 so its speed is directly proportional to the geared front wheels and thus maximum tractive ability is obtained from the synchronous speed positraction effect of the AC motors 16, 16' driving the rear wheels.

When top speed is reached in the low drive range, selector valve 92 is then conditioned to upshift gear unit 20 for high drive. Main line pressure is supplied via line 66 to high clutch motor 64 to engage high clutch 62 and provide the direct drive between turbine shaft 32 and output shaft 46. At the same time, line 60 is exhausted to simultaneously disengage low brake 56 and generator clutch 70. Thus the generator-plural motor set is automatically disconnected when controlled gear unit 20 is shifted out of the low range to the high range premitting full converter drive to the front vehicle wheels in the high drive range where maximum tractive ability is not needed. In the high drive range the one-way clutches, having the clutch construction 128, in the drive trains between the motors and rear wheels, permit the rear wheels to overrun their electric motors in the forward direction so that the motors are effectively disconnected and present no load for the driving front wheels.

This power drive transmission system has enhanced reliability due to its simplicity in that there are no transmission shift controls or fluid lines to the wheels and since low range fluid pressure automatically engages the generator drive clutch to excite the excitor field circuit, no switches are needed between the generator and motors. In addition since vehicle loading is intermittent duty, the electrical components can be lightweight-heavily loaded units and still have long service life.

Figure 2:
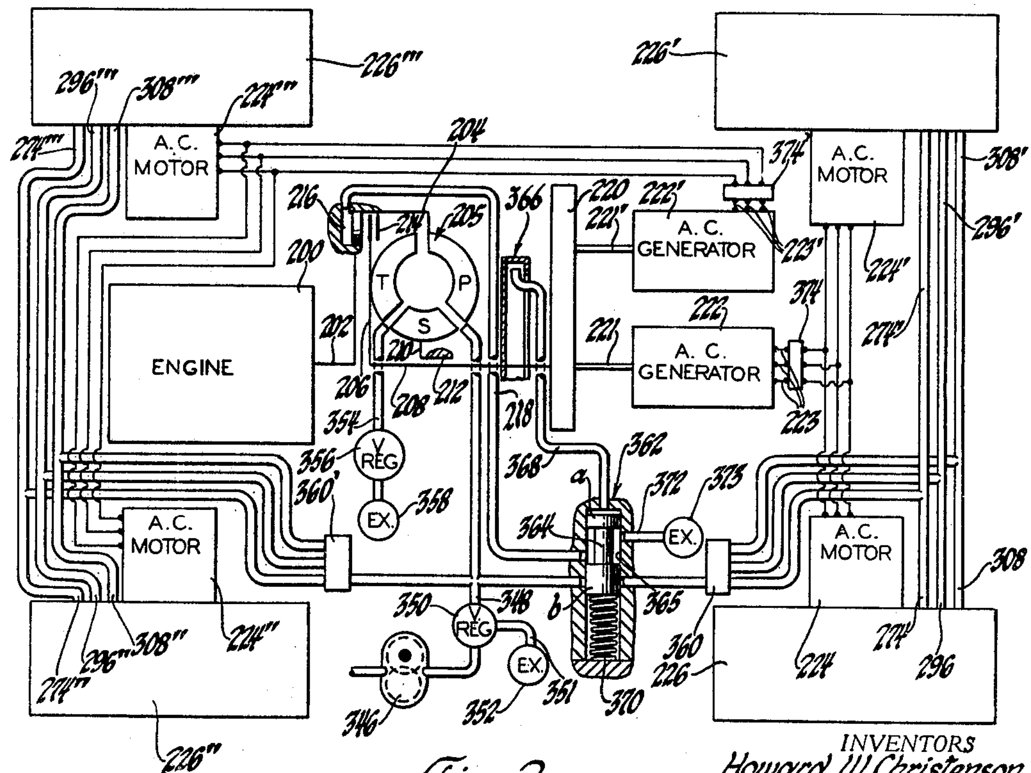

Referring now to the arrangement shown in FIGURE 2 with the FIGURE 4 power wheel drive assembly, engine 200 has its engine output shaft 202 driving rotary torque converter housing 204 which drives torque converter pump P of torque converter 205. Turbine T is connected by hub 206 to drive torque converter output or turbine shaft 208 and stator S is held against backward rotation by a one-way brake, not shown, or fixed by hub structure 210 to a stationary converter housing 212.

A lockup clutch 214 when engaged directly connects input housing 204 through hub 206 to output shaft 208. Clutch engagement is effected by a fluid actuated motor 216 operated on supply of fluid under pressure from a line 218 as will be subsequently explained. Suitable retraction springs, not shown, disengage the lockup clutch.

Converter output shaft 208 drives through a conventional differential torque divider 220, the input shaft 221 of the AC generator 222 and the input shaft 221′ of the AC generator 222′. The electric power of AC generator 222 is connected by lines 223 to two rear synchronous AC motors 224, 224′ powering the rear wheel assemblies 226, 226′ respectively and the electric power of AC generator 222′ is connected by the lines 223′ to the two forward synchronous AC motors 224″, 224‴ powering the front wheel assemblies 226″, 226‴ respectively. Differential torque divider 220 in a conventional manner equally apportions the torque of shaft 208 between generator shafts 221, 221′ while permitting a relative speed difference between the generator shafts for reasons which will become more apparent.

Since synchronous AC motors 224, 224′, 224″ and 224‴ are the same as are their drive trains to the wheels, the following description directed to motor 224 and its drive train also applies to the other motors and their drive trains. Referring to FIGURE 4, motor 224 in the actual wheel assembly construction is rigidly connected by bolts, not shown, to the nonrotatable wheel spindle 228 which is connected to the vehicle chassis through suitable suspension linkage, a portion of which is shown at 230. The dual tires 231 are rotatably supported through their rims 232 and associated hub structure 234 by antifriction bearings 236 on wheel spindle 228. Motor 224 has its output shaft 238 rotatably supported by an antifriction bearing 240 in the motor housing and drive connected to the intermediate or input shaft 242 of a multiple-ratio gear unit generally designated at 244.

Gear unit 244 is located within hollow wheel spindle 228 which provides the transmission casing or housing for this unit. Shaft 242 is rotatably supported at its right-hand end by an antifriction bearing 246 in the web 248 of the wheel spindle. Shaft 242 at its left-hand end is rotatably supported by an antifriction bearing sleeve 250 in an accommodating end bore in shaft 252 which is the input to the final reduction gear unit 254 which completes the drive to wheel hub 234.

Gear unit 244 provides a selection of three speed ratios. Motor driven shaft 242 drives sun gear 256 of the low speed gear set. Sun gear 256 meshes with planetary pinions 258 which in turn mesh with ring gear 260. Pinions 258 are mounted on a carrier 262 connected to drive shaft 252 which drives the reduction gear unit 254. An antifriction bearing 263 rotatably mounts the hub of carrier 262 and connected right-hand end of shaft 252 in a closure plate 264 bolted to the outboard end of spindle 228. Ring gear 60 may be braked to the housing provided by wheel spindle 228 by the brake and motor assembly generally designated at 265 to provide low ratio.

Assembly 265 comprises a plurality of friction plates 266 having alternate plates splined at their inner radius to ring gear 260 and an intermediate plate splined at its outer radius to the closure plate 264. The motor comprises a piston 268 normally held in a retracted position by a Belleville spring 270 whose inner radius is urged rightwardly when fluid under pressure is supplied to motor chamber 272 via low ratio line 274. The spring 270 which is levered for mechanical advantage engages the friction plates to provide the low ratio which rotates carrier 262 and connected shaft 252 in the forward direction and at a reduced speed relative to driving shaft 242.

Shaft 242 also drives sun gear 276 which meshes with pinions 278 which in turn mesh with ring gear 280. Pinions 278 are mounted on a carrier 282 which drives ring gear 260 of the low ratio gear set. An antifriction bearing 284 rotatably mounts carrier 262 on the hub of sun gear 276. Ring gear 280 is retarded or braked by connection to wheel spindle 228 through operation of the brake and motor assembly generally designated at 286. The brake comprises a plurality of friction plates 288 having alternate plates splined at their inner radius to ring gear 280 and intermediate plates splined at their outer radius to a reaction collar 289 secured to wheel spindle 228. The motor comprises an apply piston 290 normally held in a retracted position by a Belleville spring 292 whose inner radius is urged rightwardly by the piston upon the supply of fluid under pressure to motor chamber 294 via intermediate ratio line 296. This spring movement packs the friction plates for braking, the spring being levered for mechanical advantage. Actuation of this brake to retard ring gear 280 causes ring gear 260 of the low ratio gear set to be driven forward at a slow speed to provide intermediate ratio.

High ratio in gear unit 244 is provided by the clutch and motor assembly generally designated at 302 which when actuated connects shaft 242 and carrier 282. The assembly 302 comprises a motor housing member 303 driven by shaft 242 with there being provided a plurality of friction plates 304 having alternate plates splined at their outer radius to member 303 and intermediate plates splined at their inner radius to a hub extension of carrier 282. The apply piston 305 is held in its retracted position by coil springs 306 and is urged leftwardly to pack the friction plates upon the supply of fluid under pressure to the motor chamber 307 via the high ratio line 308. With engagement of this clutch preventing rotation between shaft 242 and carrier 282, both the gear sets of this gear unit are effectively locked up and there is provided a direct drive through the gear unit between shafts 242 and 252.

Shaft 252 drives sun gear 310 of the final reduction gear unit 254. Sun gear 310 meshes with the larger pinions 312 of the compound planetary pinions 314, these same larger pinions meshing with the ring gear 316 which is a nonrotatable reaction member by virtue of its rigid connection to wheel spindle 228. Compound pinions 314 are mounted on the carrier 317 and have their smaller pinions 318 meshing with the second ring gear 320 which drives wheel hub 234 in the same forward direction as shaft 252 and at a lower speed.

The brake assembly 322 to brake wheel hub 234 like the wheel brake assembly shown in FIGURE 3, has its brake disc 324 connected through its hub to the extreme left-hand end of shaft 252, the hub and connected shaft 252 being supported by the antifriction bearing 326 in the bearing plate 328 rigidly connected to wheel hub 234. The disc 324 has radial slots 330 providing pump vanes for brake cooling and its opposite braking surfaces are sandwiched between the friction rings 332, 334. Friction ring 332 is bonded to the annular brake reaction member 335 rigidly connected to wheel hub 234, member 335 having slots 336 for air ventilation of the pumped cooling air. Member 335 is rigidly secured by bolt and clamp assemblies 337 to a mounting ring 339 welded to the wheel hub 234, these bolt and clamp assemblies also serving to rigidly secure the plate 328 and ring gear 320 to the wheel hub 234. Friction ring 334 is bonded to backing plate 338 rigidly secured to the metallic bellows-type diaphragm 340. Diaphragm 340 is sealingly secured to plate 328 at its inner radius by the bolt and ring assembly 341 and at its outer radius by the bolt and clamp assemblies 337. Bearing plate 328 and diaphragm 340 delineate the brake apply chamber 342 which when supplied with fluid under pressure via line 344 packs the friction members to apply the brake.

Describing now the control system shown in FIGURE 2, to control the multiple-ratio gear unit at each driving wheel, fluid under pressure is supplied to this system from a sump, not shown, by an engine or input driven pump 346 which supplies fluid to a main line 348 at a pressure regulated by regulator valve 350. Fluid overage from valve 350 is returned to the sump via overage line 351 and exhaust 352. Main line fluid is supplied to converter 205 where pressure is regulated through a line 354 by a regulator valve 356 which exhausts overage via exhaust 358 to the sump. Fluid from main line 348 is also supplied by a three-position selector valve 360 selectively to the connected corresponding low ratio lines 274, 274′, intermediate ratio lines 296, 296′ and high ratio lines 308, 308′ of the mulitple-ratio gear units of both rear wheels. In like manner an identical selector valve 360′ will selectively supply fluid from the main line 348 to the front wheel multiple-ratio gear unit's connected corresponding low ratio lines 274″, 274‴, intermediate ratio lines 296″, 296‴ and high ratio lines 308″, 308‴. The selector valves 360, 360′ may be of the type shown in United States Patent No. 3,033,333 issued May 8, 1962 to Ulysses A. Breting and Robert M. Tuck.

Controlled fluid supply from main line 348 to lockup clutch motor line 218 is provided by the lockup shift valve 362 which has a spool valve element 364 having lands *a* and *b* of equal diameter slidable in the valve housing bore 365. A conventional Pitot governor 366 supplies a governor line 368 with fluid pressure proportional to the converter output or turbine shaft speed. The governor line 368 is connected to deliver this governor pressure to act on the end of land *a* to bias spool valve element 364 in a direction opposite the biasing direction of spring 370 acting on the opposite end of the spool valve element. Valve 362 is calibrated such that when the turbine T reaches an intermediate speed in the lowest operating range subsequently to be discussed, the governor pressure urges valve element 364 against spring 370 from the position shown, in which line 218 is exhausted between lands *a* and *b* to the sump via line 372 and exhaust 373 to a position where the exhaust line 372 is blocked by land *a* and main line 348 is connected between lands *a* and *b* to the lockup clutch motor line 218. Valve 362 does not affect main line 348.

Describing the operation of this power wheel drive transmission system, there is provided AC electric drive in all operating drive ranges provided by the multiple-ratio gear units at the wheels, the generators and motors acting as electrical drive shafts inherently having no torque multiplying ability but capable of delivering the full torque output of torque converter output shaft 208. To start the vehicle the operator shifts to a drive range, for example, the low drive range where main line fluid pressure is supplied by selector valves 360, 360′ to the low ratio lines of all four multiple ratio gear units. The torque converter supplies starting torque to generators 222, 222′ whose exciter current then couples the motors to their generators and since the motors are stopped the generators practically stop. Increasing engine shaft speed increases converter turbine torque to start the vehicle rolling and by virtue of the torque converter being in the main drive line, high slip losses are absorbed in the torque converter and not in the electrical system. As the vehicle picks up speed governor pressure controls lockup shift valve 362 to lockup the converter clutch 214, thus giving a straight electrical drive. When top speed is reached in this low operating range only one set of driving wheels, preferably the front vehicle wheels which are handling the least load, are upshifted by disengaging the low ratios in the front wheel multiple-ratio gear units and engaging their intermediate ratios through control of selector valve 360′. Lockup clutch 214 may be disengaged to cushion this shift and subsequent shifts if this is desired by the employment of a lockup clutch cutoff valve such as that shown in United States Patent No. 3,126,642 issued Apr. 14, 1964 to William B. Clark et al. since the lockup clutch shift valve shown will continue to hold this clutch engaged in the remaining drive ranges.

If, for example, all the multiple ratio gear units provide a 4:1 gear reduction in low, a 2:1 gear reduction in intermediate and 1:1 or direct drive in high, there will occur an upshift of a 2:1 ratio step for this shift and each succeeding shift. The differential torque divider 220 splits this ratio while equally apportioning the converter torque between the generators so that the engine is pulled down only a 1.414 ratio step which is determined by taking the square root of the ratio of the gear reduction in low divided by the gear reduction in intermediate. Under these conditions the generators while operating at the same torque levels operate at different power levels with the larger power level being at generator 222 which powers the motors for the rear wheels which bear the heavier load. The vehicle then accelerates to the next shift point and this time the rear wheel multiple-ratio gear units are shifted from their low drive ratio to their intermediate drive ratio by control of selector valve 360 while the front wheel multiple-ratio gear units remain in intermediate. Under these conditions torque and power are equally divided between the generators and again the engine has been pulled down only a 1.414 ratio step. This shift sequence is repeated until top vehicle speed is reached by next upshifting the front wheel gear units to high while the rear gear units remain in intermediate and finally up-shifting the rear gear units to high. Thus with a three speed range gear unit at each wheel five operating drive ranges are available. In addition the vehicle may be started in any of these drive ranges with the electric drive providing some cushioning. Full range reverse operation is provided by control of the reversal switches 374, 374′ in lines 223, 223′ respectively which reverse the direction of motor armature current.

Other features of the two embodiments of the power wheel drive transmission system include easy removal of the components of the final drive which may be effected without removal of the wheel hub and spindle from the vehicle. For example, in the FIGURE 3 construction the removal of brake assembly 154, gear unit 140 and one-way clutch assembly 128 is easily accomplished from the outboard wheel side. In the FIGURE 4 construction, the removal of brake assembly 322, gear unit 254 and gear unit 244 is also easily accomplished from the outboard wheel side.

Since obvious modifications and variations will occur to those skilled in the art, the foregoing description and drawing are intended as an illustration of the preferred embodiments of the invention and not as limitations thereof.

We claim:

1. In a power wheel drive assembly having an inboard and an outboard side, (a) a nonrotatable hollow wheel spindle, a hub structure rotatably supported on said wheel spindle, a power transmitting unit secured to said wheel spindle on the inboard power wheel drive assembly side and having an output shaft, (b) a drive train operatively connecting said output shaft through said wheel spindle to said hub structure, (c) and said drive train including a first planetary gear set having a first sun gear, a first ring gear and a first carrier having pinions meshing with said first sun gear and said first ring gear, said first sun gear being connected to said output shaft, said first ring gear being grounded to said wheel spindle, and second planetary gear set having a second sun gear, second and third ring gears and a second carrier having compound planetary pinions whose large pinions mesh with said second sun gear and said second ring gear and whose small pinions mesh only with said third ring gear, said third ring gear being connected to drive said hub structure and one-way clutch means operable to connect said first carrier to said second sun gear when said first carrier is driven in a forward direction and to disconnect said first carrier from said second sun gear when said second sun gear is driven in the forward direction.

2. The power wheel drive assembly set forth in claim 1 and a wheel brake assembly including a brake disc connected to said second sun gear, a motor selectively operable to ground and brake disc to said third ring gear and said brake disc having coolant pumping vanes for brake cooling.

3. In a power wheel drive assembly having an inboard and an outboard side, (a) a nonrotatable hollow wheel spindle, a hub structure rotatably supported on said wheel spindle, a power transmitting unit secured to said wheel spindle on the inboard power wheel drive assembly side and having an output shaft, (b) a drive train operatively connecting said output shaft through said wheel spindle to said hub structure, (c) said drive train including a multiple-ratio gear unit comprising a first planetary gear set having a first sun gear connected to said output shaft, a first ring gear and a first carrier having pinions meshing with said first sun gear and said first ring gear, a brake operable to ground said first ring gear to said wheel spindle, a second planetary gear set having a second sun gear connected to said output shaft, a second ring gear and a second carrier having planetary pinions meshing with said second sun gear and said second ring gear, said second carrier being connected to said first ring gear, a brake operable to ground said second ring gear to said wheel spindle, clutch means operable to connect said output shaft to said second carrier, (d) and said drive train further including a reduction gear set comprising a sun gear connected to said first carrier, first and second ring gears and a carrier having compound planetary pinions whose large pinions mesh with said sun gear and said first ring gear and whose small pinions mesh with only said second ring gear, said first ring gear being grounded to said wheel spindle and said second ring gear being connected to drive said hub structure.

4. In a power wheel drive assembly having an inboard and an outboard side, (a) a nonrotatable hollow wheel spindle, a hub structure rotatably suported on said wheel spindle, a power transmitting unit secured to said wheel spindle on the inboard power wheel drive assembly side and having an output shaft, (b) a drive train operatively connecting said output shaft through said wheel spindle to said hub structure, (c) said drive train including a multiple-ratio gear unit housed by said wheel spindle and comprising a first planetary gear set having a first sun gear connected to said output shaft, a first ring gear and a first carrier having pinions meshing with said first sun gear and said first ring gear to said wheel spindle to provide a low ratio drive to said first carrier, a second planetary gear set having a second sun gear connected to said output shaft, a second ring gear and a second carrier having planetary pinions meshing with said second sun gear and said second ring gear, said second carrier being connected to said first ring gear, a brake operable to ground said second ring gear to said wheel spindle to provide an intermediate ratio drive to said first carrier, clutch means operable to connect said second carrier to said output shaft to provide a direct or high ratio drive to said first carrier, (d) said drive train further including a fixed ratio reduction gear set comprising a sun gear connected to said first carrier of said first planetary gear set, first and second ring gears and a carrier having compound planetary pinions whose large pinions mesh with said sun gear and said first ring gear and whose small pinions mesh with only said second ring gear, said first ring gear being grounded to said wheel spindle and said second ring gear being connected to drive said hub structure, (e) a wheel brake assembly including a brake disc connected to said sun gear of said reduction gear set and a motor selectively operable to ground said brake disc to said second ring gear, (f) and said brake disc having coolant pumping vanes for brake cooling.

References Cited

UNITED STATES PATENTS

| | | | |
|---|---|---|---|
| 1,632,123 | 6/1927 | Else | 74—801 |
| 2,592,537 | 4/1952 | Burtnett | 74—765 X |
| 2,682,936 | 7/1954 | Almen | 188—218 |
| 2,690,248 | 9/1954 | McDowall. | |
| 3,055,448 | 9/1962 | Fagel. | |
| 3,115,204 | 12/1963 | Dence | 180—10 |
| 3,157,239 | 11/1964 | Bernotas. | |
| 3,161,249 | 12/1964 | Bouladon et al. | 180—60 X |
| 3,184,994 | 5/1965 | Stahl | 180—10 X |
| 3,217,826 | 11/1965 | Carter et al. | 180—66 X |

LEO FRIAGLIA, Primary Examiner

MILTON L. SMITH, Assistant Examiner

U.S. Cl. X.R.

74—765, 801; 188—218

PO-1050
(5/69)

UNITED STATES PATENT OFFICE
CERTIFICATE OF CORRECTION

Patent No. 3,502,166 Dated March 24, 1970

Inventor(s) Howard W. Christenson et al.

It is certified that error appears in the above-identified patent and that said Letters Patent are hereby corrected as shown below:

Column 5, line 9, "premitting" should read -- permitting --. Column 6, line 16, "60" should read -- 260". Column 9, line 41 "and" should read -- said --. Column 10, line 22 after "gear" insert -- , a brake operable to ground said first ring gear --.

SIGNED AND SEALED
AUG 11 1970

(SEAL)
Attest:

Edward M. Fletcher, Jr.
Attesting Officer

WILLIAM E. SCHUYLER, JR.
Commissioner of Patents